United States Patent [19]

Mori

[11] Patent Number: 5,509,740
[45] Date of Patent: Apr. 23, 1996

[54] PRINT BAND INITIALIZING METHOD

[75] Inventor: Masahiko Mori, Iwate, Japan

[73] Assignee: Alps Electric Co., Ltd., Tokyo, Japan

[21] Appl. No.: 284,954

[22] Filed: Aug. 2, 1994

[30] Foreign Application Priority Data

Aug. 4, 1993 [JP] Japan .................................... 5-193603

[51] Int. Cl.$^6$ ...................................................... B41J 1/20
[52] U.S. Cl. .................... 400/145.1; 400/146; 101/93.14
[58] Field of Search .............................. 400/145.1, 146; 101/93.14, 93.13

[56] References Cited

U.S. PATENT DOCUMENTS

| | | | |
|---|---|---|---|
| 4,122,769 | 10/1978 | Sery | 400/146 |
| 4,425,844 | 1/1984 | Carrington | 101/93.14 |
| 4,665,820 | 5/1987 | Chapman | 400/146 |
| 4,764,039 | 8/1988 | Bublitz | 101/93.14 |
| 4,801,223 | 1/1989 | Goto | 400/145.1 |
| 4,863,295 | 9/1989 | Miyake | 400/54 |
| 5,046,413 | 9/1991 | Gregor | 400/146 |
| 5,150,648 | 9/1992 | Okada | 101/93.14 |

*Primary Examiner*—David A. Wiecking
*Assistant Examiner*—Steven S. Kelley
*Attorney, Agent, or Firm*—Guy W. Shoup; Patrick T. Bever

[57] ABSTRACT

An object of the present invention is to provide a print control method capable of increasing a printing speed by preventing the drop of the printing speed in line feed without increasing an economical burden.

Disclosed is a print control method of carrying out printing by detecting a reference position signal SP for detecting an initial position of an endless ring-shaped type belt 13 having a multiplicity of types 15 and a type position signal CP of each of the types 15 as well as carrying out a type position count CC corresponding to each of the types 15, the method comprising the step of detecting the reference position signal SP each time the type belt 13 rotates once as well as detecting the reference position signal SP after the completion of printing of one line only if it is a final line to be printed.

3 Claims, 5 Drawing Sheets

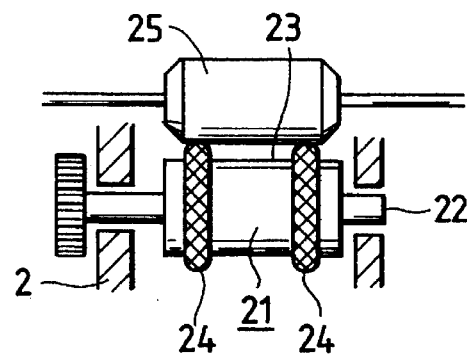
FIG. 4
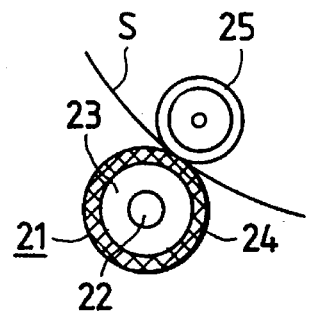
FIG. 5
FIG. 6
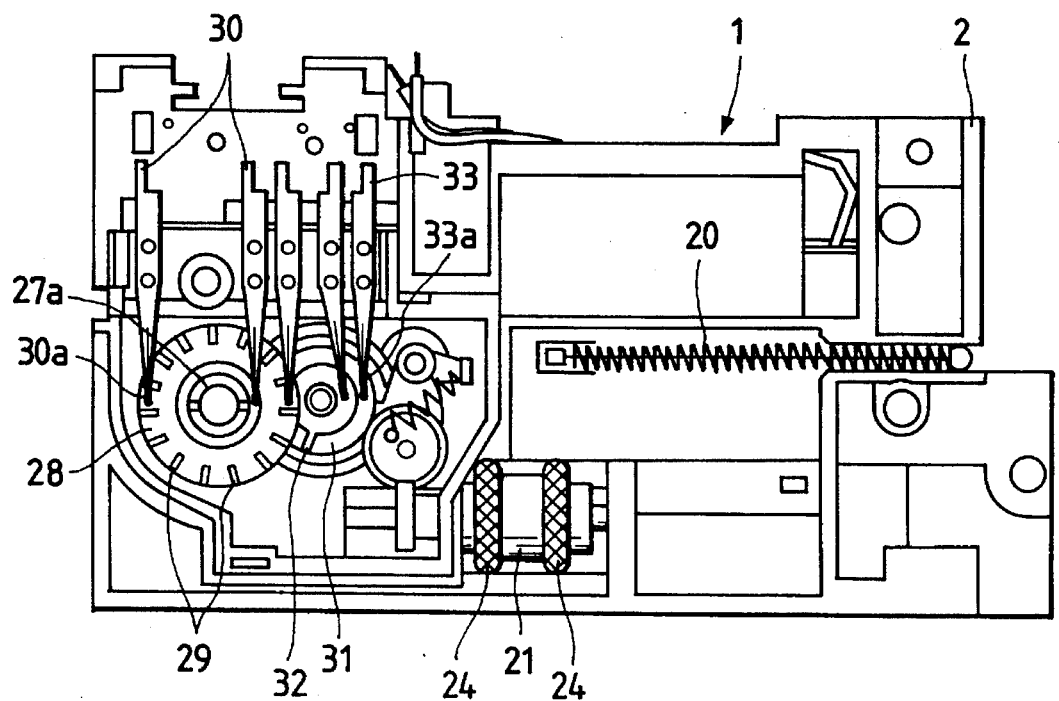

PRINT BAND INITIALIZING METHOD

BACKGROUND OF THE INVENTION

1. Field of the Invention

The present invention relates to a print control method, and more specifically, to a print control method suitable for a type belt type printer for carrying out printing to a paper by a type member having a plurality of types numerals, symbols and the like disposed at predetermined intervals.

2. Description of the Prior Art

In general, a type belt type printer is often used to a recording type electronic desk-top calculator and the like in order to carry out printing to a paper using a type member such as a type belt, a type ring or the like having a plurality of types of numerals, symbols and the like disposed at predetermined intervals.

A structure and operation of the aforesaid type member will be described below with respect to a generally employed type belt type printer for carrying out printing using an endless ring-shaped type belt by way of example with reference to FIGS. 2 to 6.

As shown in FIG. 2, this kind of a type belt type printer 1 is arranged such that a pinion 5 is fixed to an output shaft 4 of a motor 3 supported by a frame 2 and the rotation of the pinion 5 is transmitted to a driving pulley 8 through a pair of idle gears 6, 7. A selection lever 9 is rotatably disposed in the vicinity of the driving pulley 8 and the rotation of the driving pulley 8 is stopped when the claw portion 10 of the selection lever 9 is engaged with the driving pulley 8. Further, an electromagnetic clutch 11 is disposed in the vicinity of the selection lever 9. When the electromagnetic clutch 11 is turned on, the selection lever 9 is rotated so that the claw portion 10 is engaged with the driving pulley 8. The driving pulley 8 is located on a side of the frame 2 and a driven pulley 12 is located on the other side of the frame 2. An endless type belt 13 as a type member, which is composed of a belt body 14 having a multiplicity of types 15, 15, ... of numerals, symbols and the like projectingly disposed thereon at predetermined intervals, is trained around the driving pulley 8 and the driven pulley 12. The type belt 13 includes, for example, 75 pieces of types 15 of numerals, symbols and the like, as shown in detail in FIG. 3.

Returning to FIG. 2, a flat-plate-shaped platen 16 supported by the frame 2 is disposed in front of the type belt 13. A carriage 17 is disposed inside the type belt 13 and can be moved by a not shown mechanism in a lateral direction in parallel with the platen 16, the carriage 17 having a hammer 18 mounted thereon for pressing the desired type 15, which is located on the portion of the type belt 13 stretched while facing the platen 16 side, against the platen 16. Further, a pair of mask members 19, 19 having a space of substantially a piece of the type 15 on the right and left sides thereof are supported in a cantilever fashion at the lower end of the carriage 17 so that they are located between the type belt 13 and the platen 16. When the desired type 15 of the type belt 13 is pressed against the platen 16 by the hammer 18, the pair of the mask members 19, 19 prevent the types 15 on the opposite sides of the desired type 15 from being printed.

Note, the carriage 17 is returned to an initial position by a spring member 20 (refer to FIG. 6).

Incidentally, as shown in FIGS. 4 and 5, the paper feed roller 21 of a paper feed mechanism is disposed at the lower portion of the frame 2 with the rotary shaft 22 thereof rotatably supported by each frame 2 so that the paper feed roller 21 is disposed between the type belt 13 and the carriage 17. The paper feed roller 21 is arranged such that a pair of rubber rings 24, 24 spaced apart from each other are mounted to the opposite ends of the outer periphery of a cylindrical base member 23 fixed to the rotary shaft 22. Further, the pinch roller 25 of the paper feed mechanism is disposed above the paper feed roller 21 so that the pinch roller 25 is pressed against the respective rubber rings 24, 24 of the paper feed roller 21 by a not shown spring. Then, a paper S is inserted between the respective rubber rings 24, 24 of the paper feed roller 21 and the pinch roller 25 and transferred by the driving rotation the paper feed roller 21.

Returning to FIG. 2, an ink roll 26 is disposed to the type belt 13 in the vicinity of the driven pulley 12 to apply a desired ink to the respective types 15 of the ink belt 13.

As shown in FIG. 6, a code plate 28 is fixed to the common shaft 27a of the drive shaft 27 of the driving pulley 8 at the lower portion of a printer main body. A plurality of codes 29, 29 ..., which indicate positions where the types 15 of the type belt 13 are located, are formed to the outer periphery of the code plate 28 at a predetermined pitch. A plurality of contact pieces 30, 30 ... fixed to the main body at the central portion thereof have code detecting ends 30 located on the moving locus of the respective codes 29 for detecting the positions where the respective types 15 are located. A sensor gear 31 is disposed at a position adjacent to the code plate 28 so that the sensor gear 31 is rotated at a predetermined speed following the rotation of the code plate 28. The sensor gear 31 is provided with a projection 32 indicating that a printing state of the printer is at an initial position. Then, whether or not the printing state of the printer is at the initial position is determined by detecting the projection 32 by the initial position detecting end 33a of a contact piece 33 fixed to the main body.

The aforesaid generally employed type belt type printer 1 carries out printing while detecting the type positions of the type belt 13 by the respective contact pieces 30, 33. More specifically, the rotation of the motor 3 is transmitted from the pinion 5 to the driving pulley 8 through the idle gears 6, 7 and rotates the driving pulley 8. With this rotation, the type belt 13 is rotated together with the driven pulley 12. When the electromagnetic clutch 11 is turned on, the selection lever 9 is rotated and the claw portion 10 thereof is engaged with the driving pulley 8 to thereby stop the rotation of the driving pulley 8 so that the desired type 15 is stopped at a position where the type 15 is opposed to the carriage 17. Then, the type 15 is pressed against the paper S located in front of the platen 16 by driving the hammer 18 in the carriage 17 so that the ink applied to the type 15 is transferred to the paper and thus printing for a first digit is finished. Next, when the above operation is repeated necessary times after the electromagnetic clutch 11 is turned off to execute the carry of the carriage 17, printing for one line is finished, and then the carriage 17 is returned to the initial position by the spring member 20. Thereafter, the paper S is fed by one line by the pinch roller 25 of the paper feed mechanism and the respective rubber rings 24 of the paper feed roller 21 to enable a printing for a next line.

Next, a conventional print control method of this kind of the type belt type printer 1 using the type belt 15 including 75 pieces of the types 15 will be described in more detail with reference to the flowchart shown in FIG. 7.

First, the motor 3 is driven at step ST10 and the process goes to next step ST11. At step ST11, whether a reference position signal SP, which determines whether a printing state of the printer is at the initial position (reference position) or not, is turned on or not (SP= ON?) is determined by detecting the projection 32 by the initial position detecting end 33a of the contact piece 33 fixed to the main body. When the reference position signal SP is not turned on, the process waits until the reference position signal SP is turned on in a state that the motor 3 is driven. When the determination executed at step ST11 is YES, (SP=ON), the process goes to next step ST12.

Next, at step ST12, the type position of the type 15 located at the reference position is detected by detecting the code 29 of the code plate 28 by the code detecting ends 30a to thereby detect a type position signal CP, then the process goes to next step ST11.

Next, at step S13, a type position count CC of the type position signal CP of the type 15 located at the reference position detected at step ST12 is set to 0 (CC=0), then the process goes to step ST14.

Next, at step ST14, a type position signal CP of the type 15 located at the next position of the type belt 13 is detected, then the process goes to next step ST15.

Next, at step ST15, a value obtained by adding 1 to the type position count CC of the type position signal CP located at the previous position is set as the type position count CC of the type position signal CP detected at step ST14, then the process goes to next step ST16.

Next, at step ST16, it is determined whether a type position count CC of the type position signal CP is 75 or not (CC=75?). When the determination is NO, the process goes to next step ST20, whereas when the determination is YES (CC=75), the process goes to next step ST17 and determines whether the reference position signal SP is turned on or not (SP=ON?). When the determination at step ST17 is NO, the process goes to step ST18 and carries out and finishes a desired ERROR processing, whereas when the determination at step ST17 is YES (SP= ON), the process goes to next step ST19 and sets a type position count CC of the type position signal CP to 0 (CC=0), then the process goes to step ST20.

The type position count 75 (CC=75) of the type position signal CP at step ST16 has the following meaning in the type belt 13 having the 75 pieces of the types 15. That is, a type position count CC of the first type 15 located at the reference position is 0 (CC=0), a type position count CC of the final or 75th type 15 is 74 (CC= 74), and CC=75 is the type position count CC of the first type 15 located at the reference position when the type belt 13 makes a round (rotates once). Thus, whether the type belt 13 normally rotates or not (faulty rotational operation of the type belt 13) can be detected by detecting the reference position signal SP at step ST17. Note, the numeral 75 may be set to any suitable numeral depending upon the number of the types 15 of the type belt 13.

Next, at step ST20, it is determined whether the type position signal CP is to be printed or not (printing CP). When the determination is NO, the process returns to step ST14 and is repeated until the determination at step ST20 becomes YES.

When the determination at ST20 is YES, the process goes to next step ST21 and carries out desired printing by the type 15 having the type position signal CP to be printed based on a predetermined print command, then goes to next step ST22.

Next, at step ST22, it is determined whether printing for one line has been finished or not (1 line finished?). When the determination is NO, the process returns step ST20, whereas when the determination at step ST22 is YES, the process is repeated until the determination at step ST22 becomes YES.

More specifically, printing for one line is controlled by the reference position signal SP, the type position signal CP of each type 15 and the type position count CC in the process from step ST14 to step ST22, while rotating the type belt 13 composed of 75 pieces of the types 15.

When the determination at step ST22 is YES, the process goes to next step ST23 and detects the reference position signal CP of the type 15 located at a position next to the type by which the final printing of the one line is carried out, then goes to next step ST24.

Next, at step ST24, a value obtained by adding 1 to the type position count CC of the type position signal CP located at the previous position is set as the type position count CC of the type position signal CP detected at step ST23, then the process goes to next step ST25.

Next, at step ST25, it is determined whether a type position count CC of the type position signal CP is 75 or not (CC=75?) in the same way as the aforesaid step ST16. When the determination is NO, the process goes to next step ST29, whereas when the determination is YES (CC=75), the process goes to next step ST26 and determines whether the reference position signal SP is turned on or not (SP=ON?). When the determination at step ST26 is NO, the process goes to step ST27 and carries out and finishes a desired ERROR processing, whereas when the determination at step ST26 is YES (SP=ON), the process goes to next step ST28 and sets a type position count CC of the type position signal CP to 0 (CC=0), then the process goes to step ST29.

Next, at step ST29, it is determined whether the type position count is 0 or not. When the determination is NO, the process returns to step ST23, whereas when the determination at step ST29 is YES, the process returns to step ST23 and is repeated until the determination at step ST29 becomes YES.

When the determination at step ST29 is YES, the process goes to next step ST30 and determines whether a next line is to be printed or not (print for next line?). When the determination is YES, the process returns to step ST14 and is repeated until the determination at step ST30 becomes NO so that a predetermined number of lines are printed, whereas when the determination at step ST30 is NO, the printing operation is finished.

More specifically, whether the type belt 13 having finished printing of one line normally rotates or not (faulty rotational operation of the type belt 13) is detected as well as each time printing for one line is finished, the type belt 13 is returned to the reference position by the process from step ST23 to ST28.

Nevertheless, the aforesaid conventional print control method has a problem that each time the type belt 13 makes a round (rotates once) and each time the type belt 13 finishes printing for one line, the type belt 13 is returned to the reference position and faulty rotational operation of the type belt 13 is detected by detecting the reference position signal SP, thus when many lines are to be printed, each time printing shifts to a next line (line feed), the type belt 13 must be inevitably rotated and returned to the initial position, by which an excessive time is needed.

That is, as shown in FIG. 8, when the type position count CC of the type 15 which initiates printing of a next line is located between the type position count CC of the type 15 used to finish printing of a previous line and the type position count CC (CC=0) of the type at the initial position such as in a case that printing of one line is finished by the type 15 whose type position count CC is 25 (CC=25) and printing of a next line is initiated by the type 15 whose type position count CC is 27 (CC=27), printing is carried out not using the type position count. CC (CC=27: A00) located at the same round of the type belt 13 but using the type position count CC (CC=27: A01) located in a next round of the type belt 13 which is obtained by causing the type belt 13 to make an idle rotation and pass through the initial position. As a result, an additional time is needed for the idle rotation of the type belt 13, which is not only one of factors for preventing an increase of a printing speed but also causes a problem that as the number of lines to be printed is more increased, a printing speed is more lowered. Thus, there has been a desire for a print control method which does not lower a printing speed in line feed with a less economical burden.

SUMMARY OF THE INVENTION

Taking the above into consideration, an object of the present invention is to provide a print control method capable of increasing a printing speed by preventing the drop of the printing speed in line feed without increasing an economical burden by solving the problem of the aforesaid prior art.

Another object of the present invention is to provide a print control method of carrying out printing by detecting a reference position signal SP for detecting an initial position of an endless ring-shaped type belt 13 having a multiplicity of types 15 and a type position signal CP of each of the types 15 as well as carrying out a type position count CC corresponding to each of the types 15, the method comprising the step of detecting the reference position signal SP each time the type belt 13 rotates once as well as detecting the reference position signal SP after the completion of printing of one line only after a final line has been printed.

According to the print control method of the present invention arranged as described above, since reference position signal is not detected each line feed, a printing speed in line feed can be increased.

BRIEF DESCRIPTION OF THE DRAWINGS

FIG. 4 is an explanatory view showing a paper feed mechanism of the printer shown in FIG. 2;

FIG. 5 is a side view of the paper feed mechanism shown in FIG. 4;

FIG. 6 is a bottom view showing the bottom portion of the printer shown in FIG. 2;

DETAILED DESCRIPTION OF THE PREFERRED EMBODIMENTS

An embodiment of the present invention will be described below with reference to the drawings.

Figure 1:
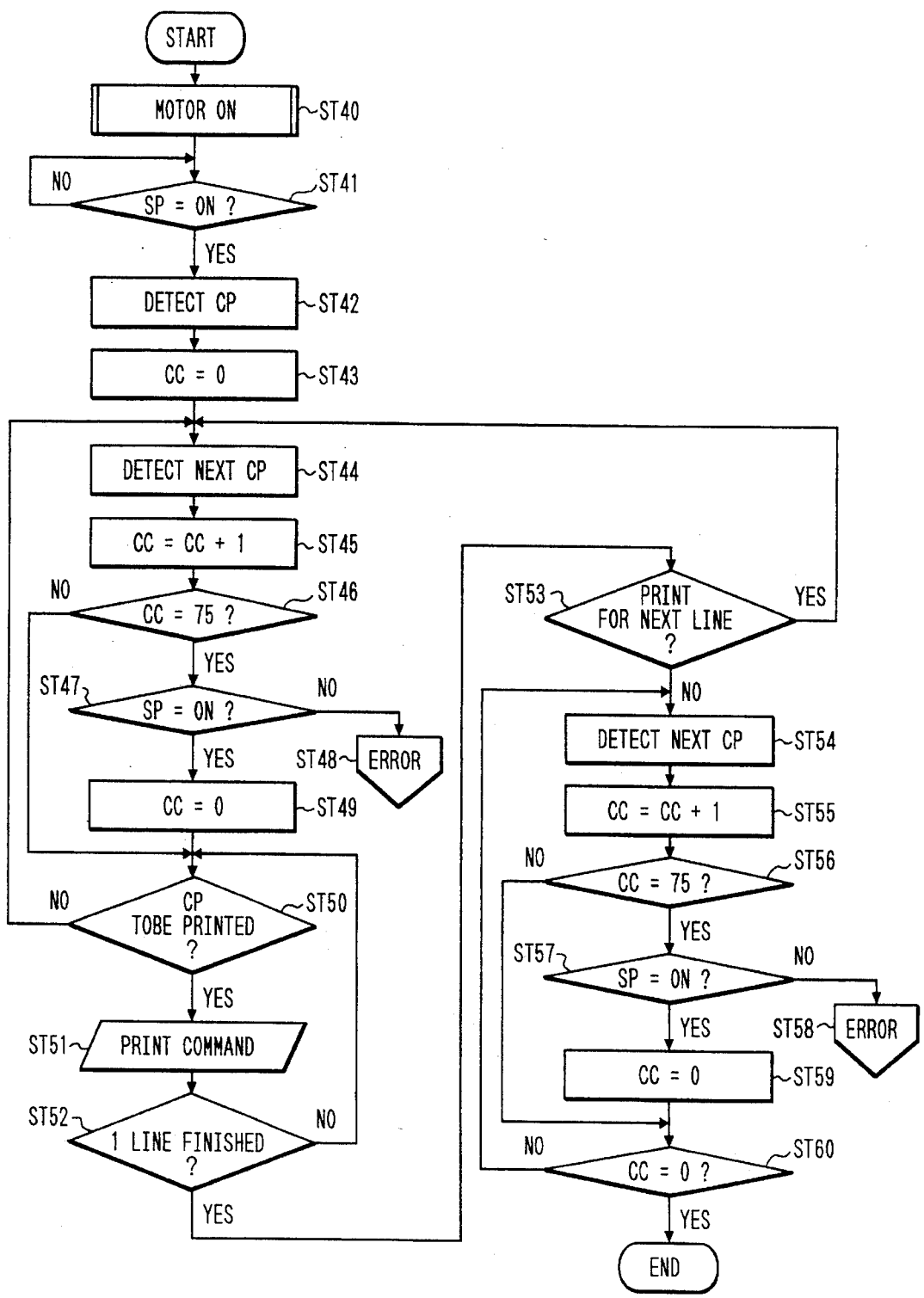
FIG. 1 is a flowchart showing an embodiment of a print control method according to the preset invention.
Figure 2:
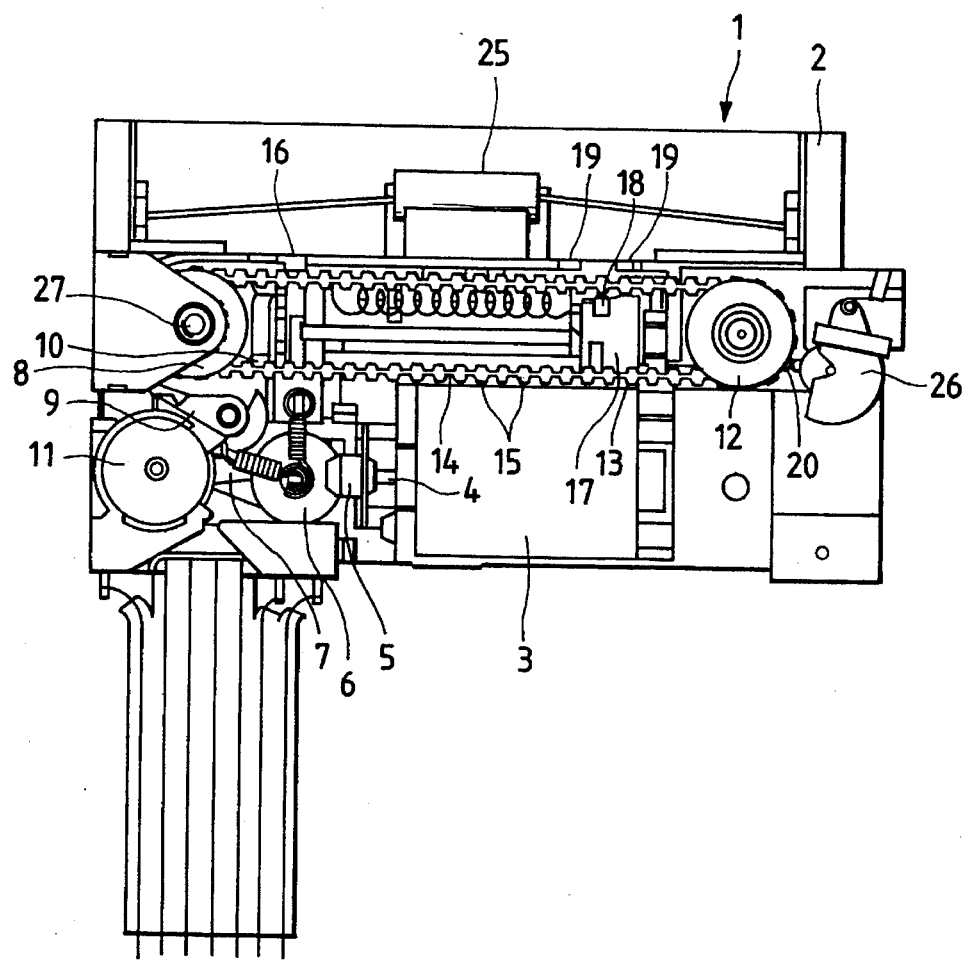
FIG. 2 is a plan view showing a type belt type printer to which the method of the present invention is applied by way of example.
Figure 3:
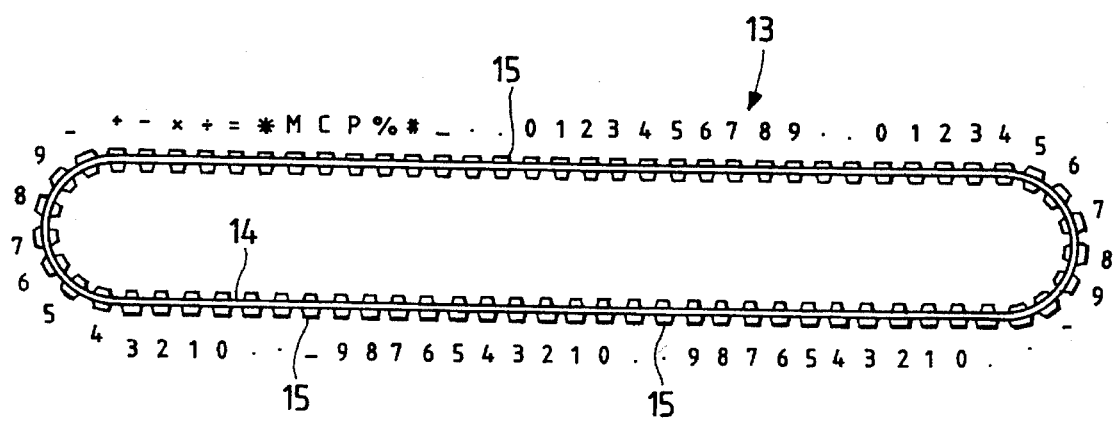
FIG. 3 is a plan view showing an arrangement of a type belt of a printer shown in FIG. 2.
Figure 7:
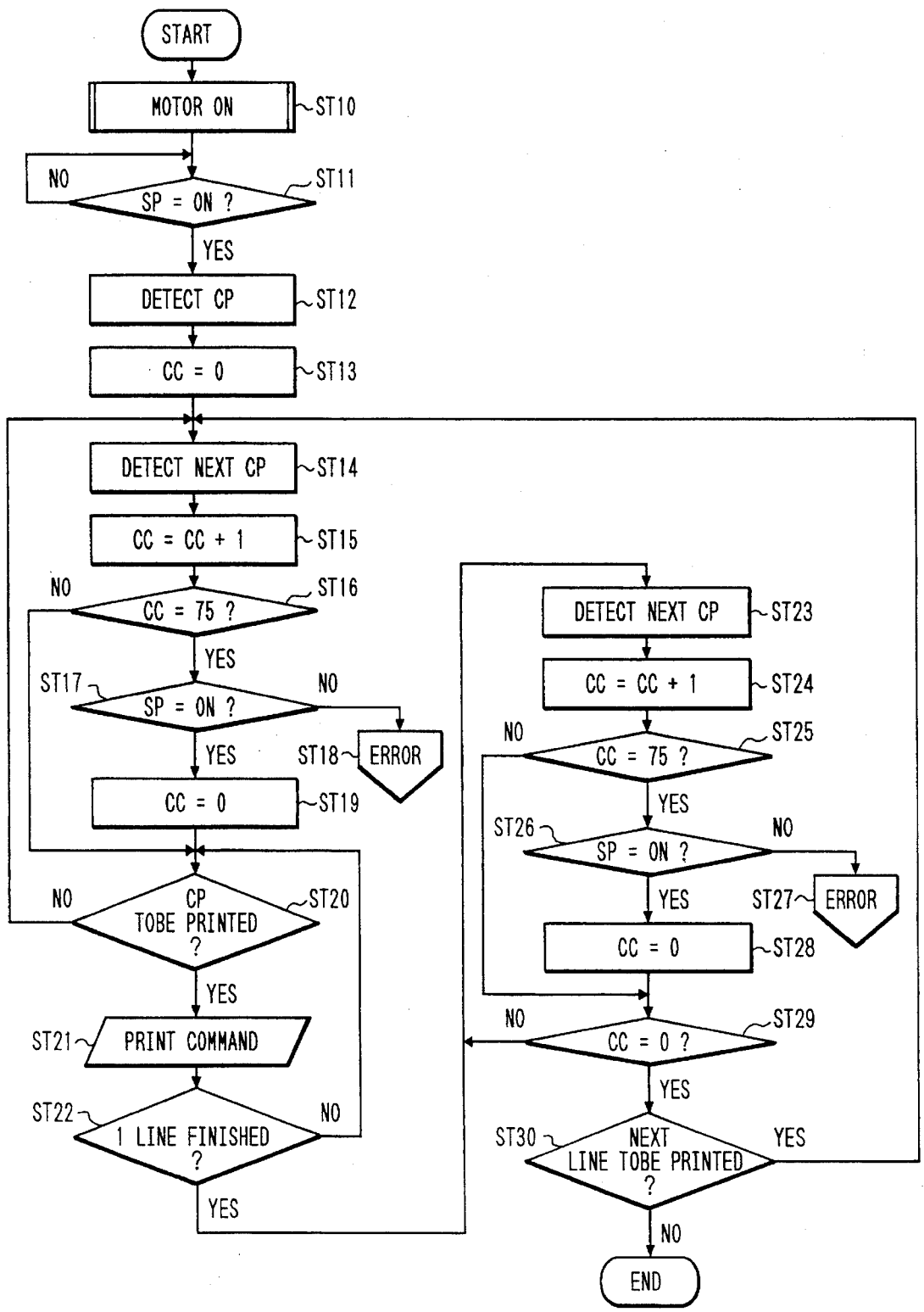
FIG. 7 is a flowchart showing a conventional print control method.

A print control method according to the present invention applicable to a type belt type printer 1 as shown in FIGS. 2 to 6 will be described with reference to the flowchart shown in FIG. 1. Note, the same numerals as used in the arrangements of the aforesaid prior art are used to denote arrangements same as or corresponding to the arrangements of the aforesaid prior art and the description thereof is omitted.

First, a motor 3 is driven at step ST40 and the process goes to next step ST41. At step ST41, whether a reference position signal SP, which determines whether a printing state of a printer is at an initial position (reference position) or not, is turned on or not (SP= ON?) is determined by detecting a projection 32 by the initial position detecting end 33a of a contact piece 33 fixed to a main body. When the reference position signal SP is not turned on, the process waits until the reference position signal SP is turned on in a state that the motor 3 is driven. When the determination executed at step ST41 is YES, (SP=ON), the process goes to next step ST42.

Next, at step ST42, the type position of the type 15 located at the reference position is detected by detecting the code 29 of a code plate 28 by code detecting end 30a to thereby detect a type position signal CP, then the process goes to next step ST41.

Next, at step S43, a type position count CC of the type position signal CP of the type 15 located at the reference position detected at step ST42 is set to 0 (CC=0), then the process goes to step ST44.

Next, at step ST44, a type position signal CP of the type located at the next position of a type belt 13 is detected, then the process goes to next step ST45.

Next, at step ST45, a value obtained by adding 1 to the type position count CC of the type position signal CP located at the previous position is set as the type position count CC of the type position signal CP detected at step ST44, then the process goes to next step ST46.

Next, at step ST46, it is determined whether a type position count CC of the type position signal CP is 75 or not (CC=75?). When the determination is NO, the process goes to next step ST50, whereas when the determination is YES (CC=75), the process goes to next step ST47 and determines whether the reference position signal SP is turned on or not (SP=ON?). When the determination at step ST47 is NO, the process goes to step ST48 and carries out and finishes a desired ERROR processing, whereas when the determination at step ST47 is YES (SP= ON), the process goes to next step ST49 and sets a type position count CC of the type position signal CP to 0 (CC=0), then the process goes to next step ST50.

The type position count 75 (CC=75) of the type position signal CP at step ST46 has the following meaning in the type belt 13 having the 75 pieces of the types 15. That is, a type position count CC of the first type 15 located at the reference position is 0 (CC=0), a type position count CC of the final or 75th type 15 is 74 (CC= 74), and CC=75 is the type position count CC of the first type 15 located at the reference position when the type belt 13 makes a round (rotates once), similarly to the prior art. Thus, whether the type belt 13 normally rotates or not (faulty rotational operation of the type belt 13) can be detected by detecting the reference position signal SP at step ST47. Note, the numeral 75 may be set to any suitable numeral depending upon the number of the types 15 of the type belt 13.

Next, at step ST50, it is determined whether the type position signal CP is to be printed or not (printing CP). When the determination is NO, the process returns to step ST44 and repeated until the determination at step ST50 becomes YES.

When the determination at ST50 is YES, the progress goes to next step ST51 and carries out desired printing by the type 15 having the type position signal CP to be printed based on a predetermined print command, then goes to next step ST52.

Next, at step ST52, it is determined whether printing for one line has been finished or not (1 line finished?). When the determination is NO, the process returns step ST50, whereas when the determination at step ST52 is YES, the process is repeated until the determination at step ST52 becomes YES.

More specifically, printing for one line is controlled by the reference position signal SP, the type position signal CP of each type 15 and the type position count CC in the process from step ST44 to step ST52 while rotating the type belt 13 composed of 75 pieces of the types 15.

When the determination at step ST52 is YES, the process goes to next step ST53.

Next, at step ST53, whether a next line is to be printed or not (print-for next line?) is determined. When the determination is YES, the process returns to step ST44 and is repeated until the determination at step ST53 becomes NO so that the predetermined number of lines are printed, whereas when the determination at step ST53 is NO, the process goes to next step ST54.

Next, at step ST54, the type position signal CP of the type 15 located next to the type which carried out final printing is detected, then the goes to next step ST55.

Next, at step ST 55, a value obtained by adding 1 to the type position count CC of the type position signal CP located at the position where the final printing was carried out is set as the type position count CC of the type position signal CP of the type 15 located at the position next to the position where the final printing was carried out by the type 15 detected at step ST54, then the process goes to next step ST56.

Next, at step ST56, it is determined whether a type position count CC of the type position signal CP is 75 or not (CC=75?) in the same way as step ST46. When the determination is NO, the process goes to next step ST60, whereas when the determination is YES (CC=75), the process goes to next step ST57 and determines whether the reference position signal SP is turned on or not (SP= ON?). When the determination at step ST57 is NO, the process goes to step ST58 and carries out and finishes a desired ERROR processing, whereas when the determination at step ST57 is YES (SP=ON), the process goes to next step ST59 and sets a type position count CC of the type position signal CP to 0 (CC=0), then the process goes to next step ST60.

Next, at step ST60, it is determined whether the type position count CC is 0 or not. When the determination is NO, the process returns to step ST54 and is repeated until the determination at step ST60 becomes YES, whereas when the determination at step ST60 is YES, the process is finished.

More specifically, whether the type belt 13 having finished printing normally rotates or not (faulty rotational operation of the type belt 13) is determined as well as the type belt 13 is returned to the reference position by the process from step ST54 to ST60.

Figure 8:
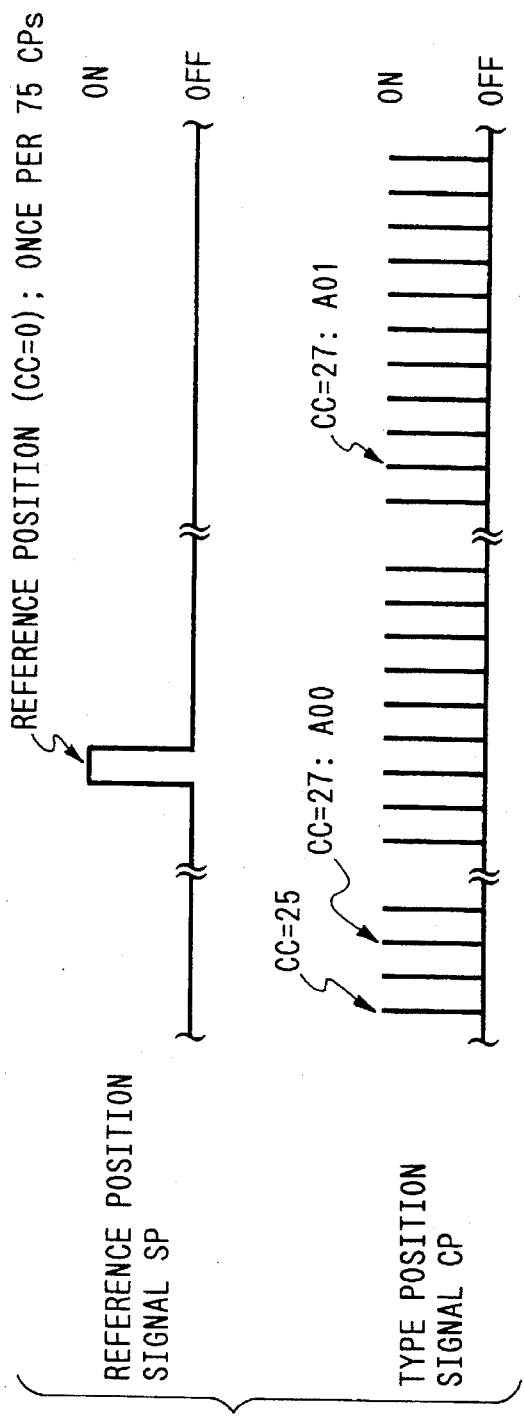
FIG. 8 is an explanatory view explaining a print state in line feed in the conventional print control method.

As descried above, this embodiment is different from the prior art in that when the type position count CC of the type 15 which initiates printing of a next line is located between the type position count CC of the type 15 used to finish printing of a previous line and the type position count CC (CC=0) of the type at the initial position such as in a case that printing of one line is finished by the type 15 whose type position count CC is 25 (CC=25) and printing of a next line is initiated by the type 15 whose type position count CC is 27 (CC=27), printing can be carried out using the type position count 27 (CC=27: A00) located in the same round of the type belt 13 (FIG. 8). As a result, a printing speed can be securely increased in line feed.

Further, since the print control method of this embodiment can be executed only by software without changing the hardware of the type belt type printer 1, an increase of an economical burden can be securely prevented.

Figure 9:
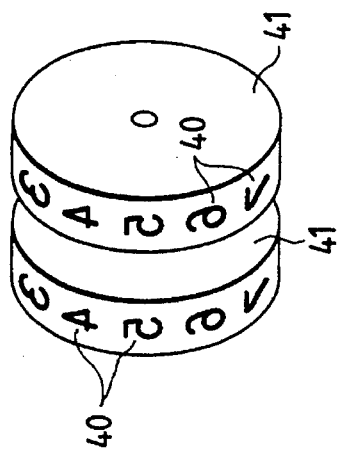
FIG. 9 is a perspective view showing an arrangement of a type ring used as a type member of a type belt type printer to which the method of the present invention is applied.

The present invention is not limited to the aforesaid embodiment, but it is needless to say also applicable to, for example, a printer using a type ring 41 as the type member having a multiplicity of types 40, 41 disposed on the outer periphery of a disk-shaped ring member as shown in FIG. 9 in place of the type belt. Further, the present invention can be changed as necessary within the range of the aforesaid gist.

As described above, the print control method of the present invention can achieve a very excellent effect of increasing a printing speed by securely preventing a drop of the printing speed in line feed without increasing an economical burden.

I claim:

1. A print control method for a type belt printer, the type belt printer including a carriage, a single hammer mounted on the carriage, a type member rotatably mounted on the carriage such that one of a multiplicity of type elements on the belt type member is positioned in front of the hammer, and counting means for counting and storing a type position of each of the type members, wherein a printing operation is performed by actuation of the hammer to press a predetermined succession of selected type elements against a print medium, the printer also including sensor means for detecting a reference position signal corresponding to a position of a reference type element relative to the hammer, the method comprising the steps of:

a) detecting an initial position of the belt type member;

b) rotating the belt type member to position one of the selected type elements in front of the hammer in response to a print command;

c) carrying out printing using said selected type member;

d) resetting a count value of the counting means each full rotation of the belt type member;

e) determining whether printing for one line is finished;

f) if printing for one line is finished, determining whether a next line is to be printed;

g) if a next line is to be printed, repeating steps a) through f) without comparing the reference position signal generated by the sensor means with a stored count value associated with the reference type element;

h) if the printing operation is completed, rotating the belt type member and detecting an initial position of said member, comparing the reference position signal generated by the sensor means with the stored count value associated with the reference type element, and performing an error correction operation if the reference position signal fails to coincide with the stored count value.

2. A print control method according to claim 1, wherein said type member is composed of an endless ring-shaped type belt.

3. A print control method according to claim 1, wherein said type member is composed of a type ring.

* * * * *